United States Patent
Kuehnle

(10) Patent No.: US 11,212,443 B2
(45) Date of Patent: Dec. 28, 2021

(54) SYSTEM AND METHOD FOR PROVIDING LOCATION-DEPENDENT DATA RECORDING MODES

(71) Applicant: Bendix Commercial Vehicle Systems, LLC, Elyria, OH (US)

(72) Inventor: Andreas U. Kuehnle, Villa Park, CA (US)

(73) Assignee: Bendix Commercial Vehicle Systems LLC, Elyria, OH (US)

(*) Notice: Subject to any disclaimer, the term of this patent is extended or adjusted under 35 U.S.C. 154(b) by 0 days.

(21) Appl. No.: 16/664,605

(22) Filed: Oct. 25, 2019

(65) Prior Publication Data
US 2021/0127062 A1  Apr. 29, 2021

(51) Int. Cl.
*H04N 5/232* (2006.01)
*H04N 5/28* (2006.01)
*H04N 7/18* (2006.01)

(52) U.S. Cl.
CPC .......... *H04N 5/23245* (2013.01); *H04N 5/28* (2013.01); *H04N 7/18* (2013.01)

(58) Field of Classification Search
CPC .............................. H04N 5/23245; H04N 5/28
See application file for complete search history.

(56) References Cited

U.S. PATENT DOCUMENTS

| | | | |
|---|---|---|---|
| 9,358,926 B2 | 6/2016 | Lambert et al. | |
| 9,792,740 B2 | 10/2017 | Lambert et al. | |
| 2010/0253540 A1* | 10/2010 | Seder | G01S 13/867 340/905 |
| 2010/0253597 A1* | 10/2010 | Seder | G08G 1/165 345/7 |
| 2015/0183372 A1* | 7/2015 | Lambert | G07C 5/008 701/36 |
| 2016/0006922 A1* | 1/2016 | Boudreau | H04N 7/185 348/207.1 |
| 2016/0209511 A1* | 7/2016 | Dolinar | G06K 9/6278 |
| 2016/0335814 A1* | 11/2016 | Tamari | G07C 5/085 |
| 2017/0004660 A1* | 1/2017 | Lambert | G07C 5/008 |

FOREIGN PATENT DOCUMENTS

WO    WO-2018039646 A1 * 3/2018 ............. H04N 7/188

OTHER PUBLICATIONS

"The Research of Vehicle Driving Multimedia Data Recording"—Meng Hao, Sun Fukang; International Conference on Intelligent Information Hiding and Multimedia Signal Processing; DOI 10.1109/IIH-MSP.2008.170 (Year: 2008).*

* cited by examiner

*Primary Examiner* — Mainul Hasan
(74) *Attorney, Agent, or Firm* — Crowell & Moring LLP

(57) ABSTRACT

A method for providing location-dependent recording modes for an event detection and reporting system of a vehicle includes detecting that the vehicle is approaching or is in an area in which the recordation of data is restricted by rule, and operating the event detection and reporting system in a restricted mode in response to detecting that the vehicle is approaching or is in the area in which the recordation of data is restricted. The method also includes recording, while the event detection and reporting system is in the restricted mode, either correlated video or non-video data in an obscured format, and the other of the correlated video or non-video in an unobscured format.

18 Claims, 3 Drawing Sheets

SYSTEM AND METHOD FOR PROVIDING LOCATION-DEPENDENT DATA RECORDING MODES

FIELD OF THE INVENTION

The invention relates to providing location-dependent data recording modes and, in particular, to providing location-dependent data recording modes which allow a vehicle to adhere to location-dependent recording restrictions, while at the same time providing a gapless, correlated data set to facilitate post-processing and data analysis.

BACKGROUND

Current methods of capturing driving and vehicle event data relating to a detected event include the capturing of video data and GPS information. However, certain geographic areas, such as military bases, may not allow video recording or other data collection in or around such areas. Similarly, the capturing of video, GPS or other data may be time restricted for a given location, for example when sensitive activities are scheduled to occur at a given location.

The current approach for adhering to such restrictions is to simply turn off the vehicle's recording system. However, aside from the inconvenience of having to manually operate the vehicle's recording system, this known approach can be overly restrictive in that even permissible data is not collected while the vehicle's recording system is turned off. Moreover, even if non-video and/or non-GPS data continues to be collected while the vehicle's recording system is turned off, there will still be holes in or desynchronization of the data since there is no corresponding video and/or GPS data to associate with any other event data that may have been collected.

As such, there is a need in the art for a system and method that overcomes the aforementioned drawbacks.

SUMMARY OF THE INVENTION

In one embodiment of the invention, a method for providing location-dependent recording modes for an event detection and reporting system of a vehicle includes operating the event detection and reporting system in an unrestricted mode in which video data captured by a camera and non-video data captured by one or more sensors are correlated and recorded in one or more memory modules of the system in an unobscured format. The method includes detecting that the vehicle is approaching or is in an area in which the recordation of data is restricted by rule, and operating the event detection and reporting system in a restricted mode in response to detecting that the vehicle is approaching or is in the area in which the recordation of data is restricted. While the event detection and reporting system is in the restricted mode, the method includes recording either of the correlated video or non-video data in the one or more memory modules in an obscured format, and recording the other of the correlated video or non-video data in an unobscured format.

Other objects, advantages and novel features of the present invention will become apparent from the following detailed description of one or more preferred embodiments when considered in conjunction with the accompanying drawings.

DESCRIPTION OF EXEMPLARY EMBODIMENTS OF THE INVENTION

Figure 1:
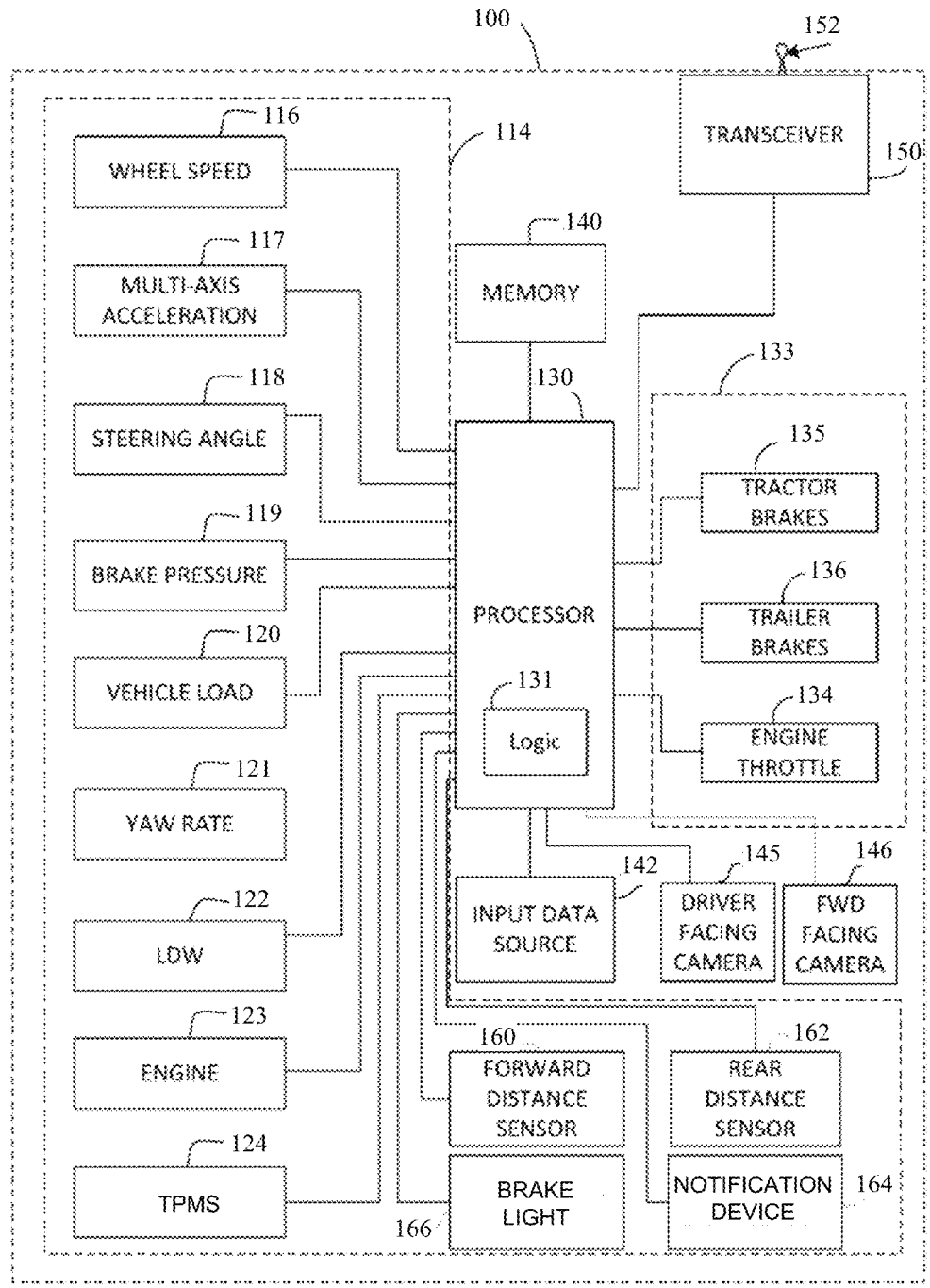
FIG. 1 is a block diagram that illustrates one embodiment of a vehicle-based computer system configured to implement one or more aspects of the invention.

In the following description of the present invention reference is made to the accompanying figures which form a part thereof, and in which is shown, by way of illustration, exemplary embodiments illustrating the principles of the present invention and how it is practiced. Other embodiments can be utilized to practice the present invention and structural and functional changes can be made thereto without departing from the scope of the present invention In certain embodiments, the invention may be implemented by an on-vehicle event detection and reporting system that may include one or more forward facing cameras that are configured such that the field of view of the camera(s) captures the scene ahead of the vehicle from, for example, the perspective of a driver of the vehicle. Also, one or more driver facing cameras may be used to capture a view of the driver of the vehicle, and/or a view of other areas of the cabin, as the driver controls the vehicle while driving. Still other embodiments may include cameras configured to capture other scenes relative to the vehicle. For instance, embodiments may include cameras configured to capture the scene behind the vehicle, to either side of the vehicle, etc.

The event detection and reporting system may be further configured to collect and provide non-video data, including non-video event-based data corresponding to a detected driving or vehicle event that occurred at a particular point in time during a driving excursion. Such event-based data can include data collected from components of, or components interacting with, the event detection and reporting system.

These components can detect, in real time, driving or vehicle-related events that happen over the course of a driving excursion. The components can report such events to the event detection and reporting system. Examples of events that may be reported to/collected by the event detection and reporting system in real time include, for example and without limitation, excessive acceleration, excessive braking, exceeding speed limit, excessive curve speed, excessive lane departure, lane change without turn signal, loss of video tracking, LDW system warning, following distance alert, forward collision warning, collision mitigation braking, etc.

In accordance with an embodiment, the event detection and reporting system may use data collected directly from vehicle components (e.g., devices, sensors, or systems), and data collected from an analysis of vehicle video, to generate event datasets that correspond in time with one or more detected driving events. Event data generated for a detected event may be associated with captured video frames whose timeline spans or overlaps the time when the event was detected/collected. Event data generated from an event determined from processing of captured vehicle video may at least be associated with the video from which it was generated, but may also be associated with other captured video frames whose timelines span or overlap the time when the event was detected/collected (in these scenarios, the time may be calculated based on the video frame or frames from which the event object was derived).

The particular invention disclosed and claimed herein relates to a system and method for providing location-dependent data recording modes which allows a vehicle to adhere to location-dependent recording restrictions, such as video recording restrictions, while at the same time generating a gapless, correlated data set to facilitate post-processing and data analysis. In certain embodiments, this is achieved by entering a different mode of recording in response to detecting that a restricted area has been entered or approached. This different mode of recording is characterized by the fact that one or more video signal production settings of the camera in question is/are altered in a manner which obscures the recorded image data. For example, modern imager chips have settings that control the video signal produced, including gain, exposure time, black clamping level, etc. One aspect of the invention is to provide a mode of recording in which one or more of these setting is modified (e.g., very low or very high gain, for example) in response to detecting a video-recording-restricted area. As such, unlike the prior art approach, a video signal is still produced, thereby preserving recording format and time integrity, but in manner which otherwise complies with the detected video recording restriction.

In the context of a location-recording-restricted area (i.e., an area whose location is prohibited from being recorded or reported), another aspect of the invention is to provide a GPS location recording mode in which the precision of the data is intentionally obscured, such as by rounding, approximation, or correlated random noise addition. As such, the system will still provide an approximate value for location, with precision/noise level as desired, again maintaining data format and time integrity, while at the same time adhering to the known restriction. Other embodiments are described in more detail below with reference to FIGS. 1-3.

Referring first to FIG. 1, by way of overview a schematic block diagram is provided illustrating details of an event detection and reporting system configured to be used in accordance with one or more exemplary embodiments of the invention. The in-vehicle event detection and reporting system 100 may be adapted to detect a variety of operational parameters and conditions of the vehicle and the driver's interaction therewith and, based thereon, to determine if a driving or vehicle event has occurred (e.g., if one or more operational parameter/condition thresholds has been exceeded). Data related to detected events (i.e., event data) may then be stored and/or transmitted to a remote location/server, as described in more detail below. In an alternate embodiment, a time delay may be implemented in order to avoid transmitting the data until the vehicle has left a restricted area, for example.

The event detection and reporting system 100 of FIG. 1 may include one or more devices or systems 114 for providing input data indicative of one or more operating parameters or one or more conditions of a commercial vehicle. Alternatively, the event detection and reporting system 100 may include a signal interface for receiving signals from the one or more devices or systems 114, which may be configured separate from system 100. For example, the devices 114 may be one or more sensors, such as but not limited to, one or more wheel speed sensors 116, one or more acceleration sensors such as multi-axis acceleration sensors 117, a steering angle sensor 118, a brake pressure sensor 119, one or more vehicle load sensors 120, a yaw rate sensor 121, a lane departure warning (LDW) sensor or system 122, one or more engine speed or condition sensors 123, and a tire pressure (TPMS) monitoring system 124. The event detection and reporting system 100 may also utilize additional devices or sensors in the exemplary embodiment including for example a forward distance sensor 160 and a rear distance sensor 162 (e.g., radar, lidar, etc.). Other sensors and/or actuators or power generation devices or combinations thereof may be used of otherwise provided as well, and one or more devices or sensors may be combined into a single unit as may be necessary and/or desired.

The event detection and reporting system 100 may also include brake light(s) 166 and/or notification device 164, and may be usable to provide headway time/safe following distance warnings, lane departure warnings, and warnings relating to braking and or obstacle avoidance events.

The event detection and reporting system 100 may also include a logic applying arrangement such as a controller or processor 130 and control logic 131, in communication with the one or more devices or systems 114. The processor 130 may include one or more inputs for receiving input data from the devices or systems 114. The processor 130 may be adapted to process the input data and compare the raw or processed input data to one or more stored threshold values or desired averages, or to process the input data and compare the raw or processed input data to one or more circumstance-dependent desired value.

The processor 130 may also include one or more outputs for delivering a control signal to one or more vehicle systems 133 based on the comparison. The control signal may instruct the systems 133 to provide one or more types of driver assistance warnings (e.g., warnings relating to braking and or obstacle avoidance events) and/or to intervene in the operation of the vehicle to initiate corrective action. For example, the processor 130 may generate and send the control signal to an engine electronic control unit or an actuating device to reduce the engine throttle 134 and slow the vehicle down. Further, the processor 130 may send the control signal to one or more vehicle brake systems 135, 136 to selectively engage the brakes (e.g., a differential braking operation). A variety of corrective actions may be possible and multiple corrective actions may be initiated at the same time.

The event detection and reporting system 100 may also include a memory portion 140 for storing and accessing system information, such as for example the system control logic 131. The memory portion 140, however, may be separate from the processor 130. The sensors 114 and processor 130 may be part of a preexisting system or use components of a preexisting system.

The event detection and reporting system 100 may also include a source of input data 142 indicative of a configuration/condition of a commercial vehicle. The processor 130 may sense or estimate the configuration/condition of the vehicle based on the input data, and may select a control tuning mode or sensitivity based on the vehicle configuration/condition. The processor 130 may compare the operational data received from the sensors or systems 114 to the information provided by the tuning.

In addition, the event detection and reporting system 100 is operatively coupled with one or more driver facing imaging devices, shown in the example embodiment for simplicity and ease of illustration as a single driver facing camera 145 that is trained on the driver and/or trained on the interior of the cab of the commercial vehicle. However, it should be appreciated that one or more physical video cameras may be disposed on the vehicle such as, for example, a video camera on each corner of the vehicle, one or more cameras mounted remotely and in operative communication with the event detection and reporting system 100 such as a forward facing camera 146 to record images of the roadway ahead of the vehicle. In the example embodiments, driver data can be collected directly using the driver facing camera 145 in accordance with a detected driver head positon, hand position, or the like, within the vehicle being operated by the vehicle. In addition, driver identity can be determined based on facial recognition technology and/or body/posture template matching.

Still yet further, the event detection and reporting system 100 may also include a transmitter/receiver (transceiver) module 150 such as, for example, a radio frequency (RF) transmitter including one or more antennas 152 for wireless communication of the automated control requests, GPS data, one or more various vehicle configuration and/or condition data, or the like between the vehicles and one or more destinations such as, for example, to one or more services (not shown) having a corresponding receiver and antenna. The transmitter/receiver (transceiver) module 150 may include various functional parts of sub portions operatively coupled with a platoon control unit including for example a communication receiver portion, a global position sensor (GPS) receiver portion, and a communication transmitter. For communication of specific information and/or data, the communication receiver and transmitter portions may include one or more functional and/or operational communication interface portions as well.

The processor 130 is operative to combine selected ones of the collected signals from the sensor systems described above into processed data representative of higher level vehicle condition data such as, for example, data from the multi-axis acceleration sensors 117 may be combined with the data from the steering angle sensor 118 to determine excessive (exit) curve speed event data. Alternatively or in addition, map data may be used to inform the system of an approaching road curve or corner. Other hybrid event data relatable to the vehicle and driver of the vehicle and obtainable from combining one or more selected raw data items from the sensors includes, for example and without limitation, excessive braking event data, excessive curve speed event data, lane departure warning event data, excessive lane departure event data, lane change without turn signal event data, loss of video tracking event data, LDW system disabled event data, distance alert event data, forward collision warning event data, haptic warning event data, collision mitigation braking event data, ATC event data, ESC event data, RSC event data, ABS event data, TPMS event data, engine system event data, statistics for following distance event data, statistics for fuel consumption event data, average ACC usage event data, and late speed adaptation (such as that given by signage or exiting).

The event detection and reporting system 100 of FIG. 1 is suitable for executing embodiments of one or more software systems or modules that perform vehicle brake strategies and vehicle braking control methods according to the subject application. The example event detection and reporting system 100 may include a bus or other communication mechanism for communicating information, and a processor 130 coupled with the bus for processing information. The computer system includes a main memory 140, such as random access memory (RAM) or other dynamic storage device for storing instructions and loaded portions of the trained neural network to be executed by the processor 130, and read only memory (ROM) or other static storage device for storing other static information and instructions for the processor 130. Other storage devices may also suitably be provided for storing information and instructions as necessary or desired.

Instructions may be read into the main memory 140 from another computer-readable medium, such as another storage device or via the transceiver 150. Execution of the sequences of instructions contained in main memory 140 causes the processor 130 to perform the process steps described herein. In an alternative implementation, hard-wired circuitry may be used in place of or in combination with software instructions to implement the invention. Thus implementations of the example embodiments are not limited to any specific combination of hardware circuitry and software.

Figure 2:
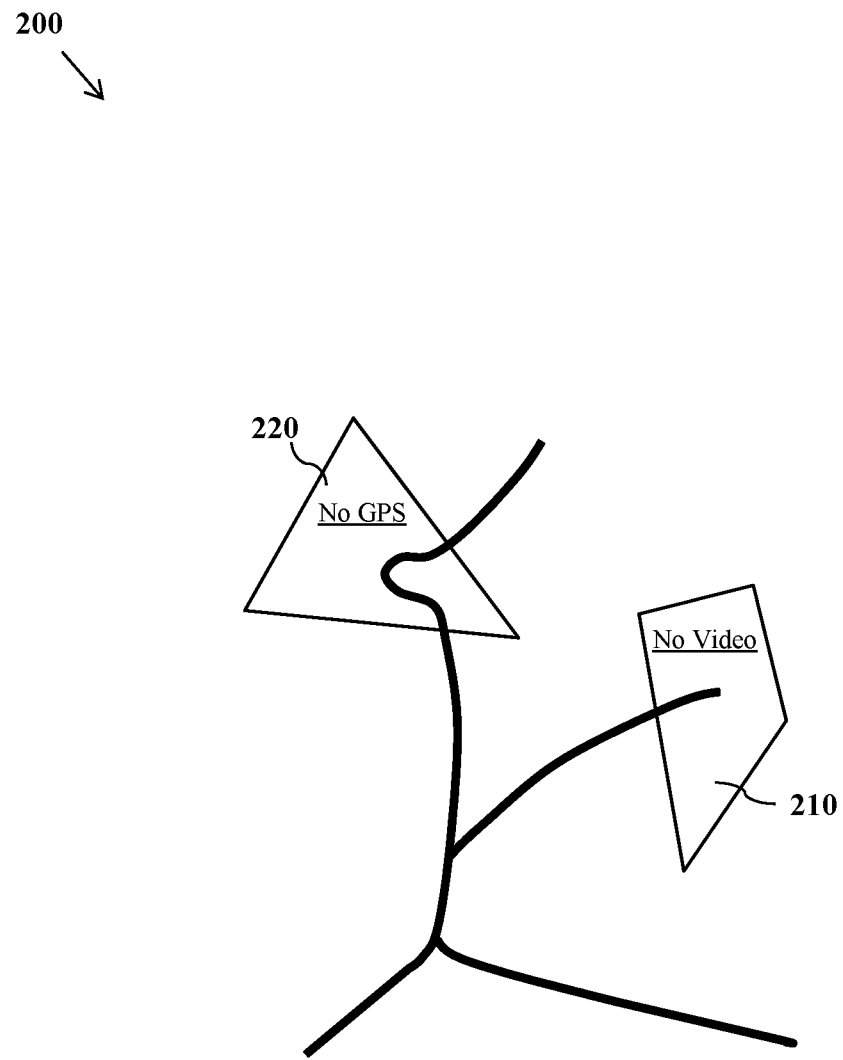
FIG. 2 depicts one embodiment of simplified map data usable to implement on or more aspects of the invention.

Referring now to FIG. 2, depicted is map data 200, which may preferably be stored on the vehicle in an encrypted or otherwise restricted form. The vehicle's current location may be regularly/periodically compared to the map data 200 to determine if the vehicle is approaching or is in a video-recording-restricted (area 210) or in a location-recording-restricted area (area 220). It should be appreciated that the map data 200 may only indicate where the mode changes should apply, and not details of the restricted area. Although not depicted, it should further be appreciated that the principles of the invention are equally applicable to other types of location-based recording restrictions, such as areas with audio restrictions.

Figure 3:
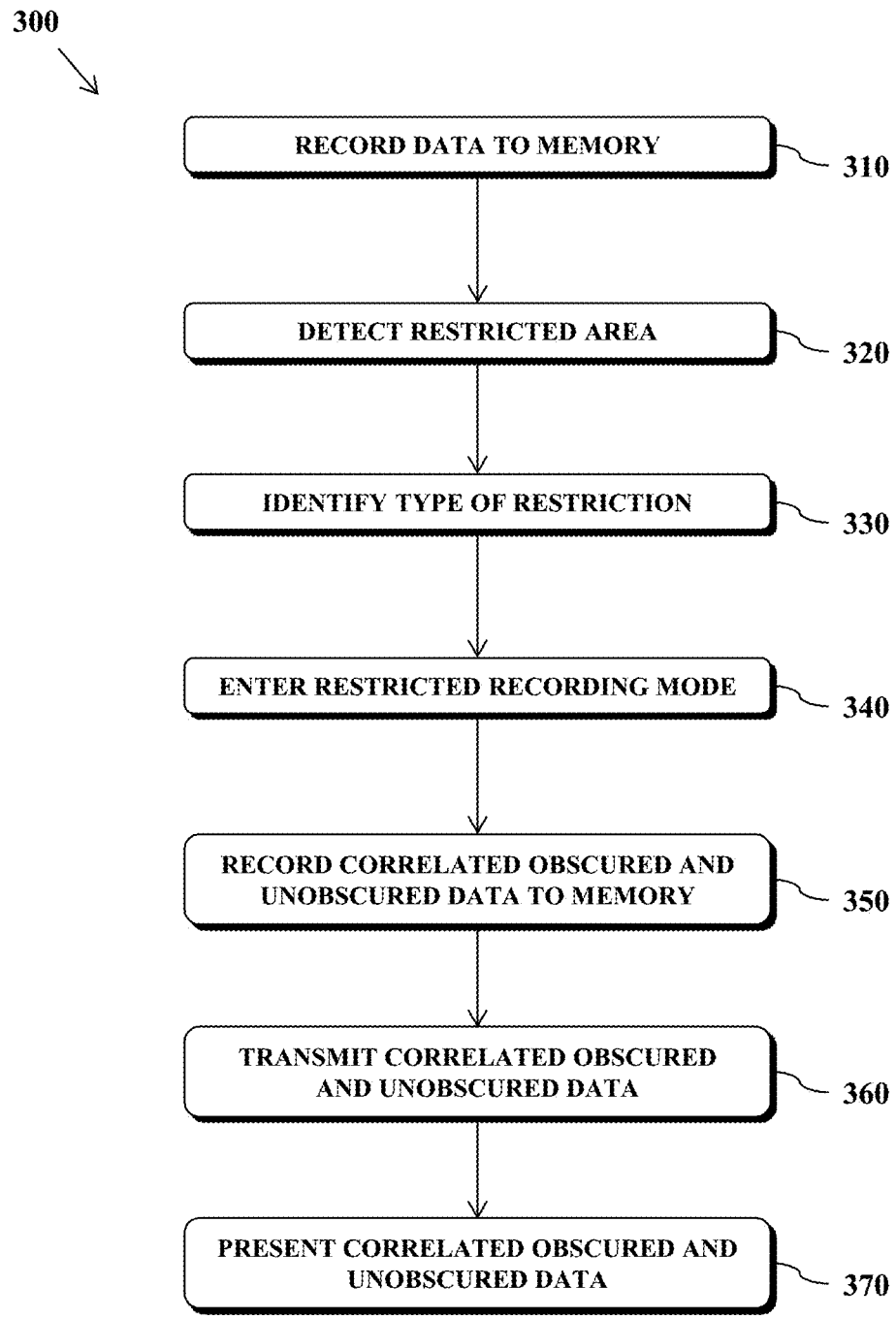
FIG. 3 illustrates one embodiment of a process for implementing one or more aspects of the invention.

Referring now to FIG. 3, operation of an event detection and reporting system (e.g., system 100 of FIG. 1) is described in accordance with the principles of the invention. Operation begins at block 300 with the event detection and reporting system operating in a first, unrestricted mode in which video and non-video data is captured and recorded to an on-vehicle memory in an unrestricted fashion. This data may be captured on a continuous basis or in response to a detected vehicle or driving event. In certain embodiments, such data may comprise a sequence of video frames with separate but associated sensor data that has been collected from one or more on-vehicle sensors or devices, as detailed above, during a window of time in which a detected event occurred (e.g., 10 seconds before to 10 seconds after a detected event). In the case of an on-vehicle continuous DVR memory, captured video frames and metadata may be stored on a continuous basis, irrespective of whether an event has been detected or not. Video frames in the continuous DVR memory may include the same type of sensor data as that stored in the event buffer, but may instead be stored as metadata in frame headers, for example. Sensor data stored in the continuous DVR memory as metadata would preferably be associated with the frames of captured video that occurred at the same time as the sensor data was collected.

It should further be appreciated that both the video and non-video data may be timestamped based on a central or common clock such that the video and non-video data can be cross-referenced using the timestamps. Similarly, embedded tags within the video and/or non-video data may be used to correlate the data sets. Additionally, non-video data may be correlated to video data by storing the non-video data in the frame headers. One or more techniques for storing video and non-video data in an associated fashion, whether in a single memory or in separate memories, are described in detail in U.S. application Ser. No. 16/208,375, entitled "System and Method for Providing Complete Event Data from Cross-Referenced Data Memories," which is assigned to the assignee hereof, and the entire disclosure of which is hereby incorporated by reference.

Process 300 continues to block 320 where the event detection and reporting system detects that the vehicle is in or is approaching an area in which data recordation is restricted in some fashion. As described above with reference to FIG. 2, this may be carried out by regularly/periodically comparing the vehicle's current location and bearing to map data or table data comprising known restricted areas, such as known video-recording-restricted areas, location-recording-restricted areas, or otherwise.

In response to the event detection and reporting system detecting such a restricted area, process 300 continues to block 330 where the type of restriction is identified. Again, this may be determined by consulting map data or table data stored on the vehicle, preferably in a secure form.

Once the event detection and reporting system identifies the type of restricted area, process 300 continues to block 340 where the event detection and reporting system enters a second, restricted mode in which captured video and/or non-video data (whether continuous or event-based) is only recorded in a manner which complies with the identified restriction.

In the case of a video-recording-restricted area, the second mode may comprise modifying one or more image setting of the vehicle's camera, such as gain, exposure time, black clamping level, etc., in a manner which obscures the recorded video data such that the details of the imagery are not readily or at all discernible to the human eye. Specifically, the second, restricted mode of recording in which one or more of the camera image settings are modified (e.g., very low or very high gain, for example) may be entered in response to detecting a video-recording-restricted area. As such, even in a video-recording-restricted area a video signal is produced which can be stored in a manner that preserves the recording format and any corresponding association to non-video data captured during the time the vehicle is in the video-recording-restricted area.

In the case of a location-recording-restricted area, the second mode may comprise obscuring the precision of GPS data captured by the vehicle, such as by rounding, approximation, or correlated random noise addition, such that the details of the restricted location is not readily or at all discernible from the recorded data. This same approach may be applied to other recordable values, such as speed. Rounding or thresholding may reduce a continuously variable speed (or acceleration or other) value to simply zero or not zero, rounded to e.g. 0, 20, 40, 60 mph, etc. Added noise may obscure details, again as required. As with the example above, in response to detecting or approaching a location-recording-restricted area, the GPS data may be obscured before it is written to an on-vehicle memory. This again preserves the recording format and any corresponding association to video or other non-video data captured during the time the vehicle is in the location-recording-restricted area.

Similarly, in the case of an audio-recording restricted area, the second mode may comprise modifying one or more audio settings (pre-amplification, main gain, noise suppression, etc.) of a microphone to produce an obscured or even a 'blank' signal which can still be stored in a manner that preserves the recording format and any corresponding association to other data.

Continuing to refer to FIG. 3, process 300 may then proceed to block 350 with the recording of any obscured data and the unobscured data, which may preferably have been captured at the same time and correlated as detailed above and as further detailed in application Ser. No. 16/208, 375, which was incorporated by reference above. Specifically, the obscured data and the unobscured data may be recorded to one or more on-vehicle memories. For example, while in a video-recording-restricted area when the system is operating in the second, restricted mode to produce obscured video data, such obscured video data may be recorded to an on-vehicle digital video recorder (DVR) memory, which continuously stores video data captured by an on-vehicle camera. Simultaneously, other non-video data may be stored either in the header frames of the obscured video data or in a separate buffer or memory, such as in response to detecting a driving or vehicle event. When the obscured video data and non-video data are stored either in separate memories, the data can be accurately cross-referenced or correlated since there are no data gaps.

It should further be appreciated that the correlated obscured and unobscured data may then be transmitted by the on-vehicle event detection and reporting system to a remote server at block 360 using, for example, wireless transceiver 150 of FIG. 1. This transmission of event data may be done automatically in response to the occurrence of the detected event. A delayed transmission of the data may be effected, for instance, until when the restricted area has been exited, thus providing further obscuration.

Once the correlated event data has been transmitted from the on-vehicle event detection and reporting system to the remote server, whether automatically or upon request, the data may be provided to a user-side viewing portal or application at block 370. In certain embodiments, the viewing portal may comprise a web application provided on a user computer, such as the web application. It should further be appreciated that the viewing portal or application may be a dedicated software program executing on a computer or mobile device that is accessible to the user. Regardless of how the data is made available to a user-side device, the user will be able to view or otherwise discern only the unobstructed event data, while the details of the obscured data remain hidden in conformity with the requirements of the restricted area in question. And, since there are no data gaps despite at least some of the data originating from a restricted area, the user will be able to engage in all of the same post-processing and data analysis, which is not otherwise dependent of the specific details of the obscured data.

Finally, it should further be appreciated that the system may further be configured to detect when the vehicle has exited the restricted area and, in response thereto, automatically exit the second, restricted mode so that regular data capturing and recording is resumed.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner on one or more embodiments without limitation.

In accordance with the practices of persons skilled in the art of computer programming, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

The term "server" means a functionally-related group of electrical components, such as a computer system that may or may not be connected to a network and which may include both hardware and software components, or alternatively only the software components that, when executed, carry out certain functions. The "server" may be further integrated with a database management system and one or more associated databases.

In accordance with the descriptions herein, the term "computer readable medium," as used herein, refers to any non-transitory media that participates in providing instructions to the processor 130 for execution. Such a non-transitory medium may take many forms, including but not limited to volatile and non-volatile media. Non-volatile media includes, for example, optical or magnetic disks. Volatile media includes dynamic memory for example and does not include transitory signals, carrier waves, or the like.

In addition and further in accordance with the descriptions herein, the term "logic," as used herein, with respect to FIG. 1, includes hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An event detection and reporting system in a vehicle, the system comprising:
    a camera configured to capture video data;
    one or more sensors configured to capture non-video data;
    a GPS module;
    one or more memory modules; and
    a processor, coupled to the camera, the sensor, the GPS module and the memory, wherein the processor is configured to:
        operate the system in an unrestricted mode in which the captured video data and non-video data are recorded such that the video data and non-video data are correlated in the one or more memory modules in an unobscured data format,
        detect that the vehicle is approaching or is in an area in which the recordation of data is restricted by rule,
        operate the system in a restricted mode in response to detecting that the vehicle is approaching or is in the area in which the recordation of data is restricted,
        record, while the system is in the restricted mode, either of the correlated video or non-video data in the one or more memory modules in an obscured data format that maintains the correlation of the unobscured data format, and
        record, while the system is in the restricted mode, the other of the correlated video or non-video data in the one or more memory modules in the unobscured data format.

2. The system of claim 1, wherein the video data and non-video data are recorded based a detected driving or vehicle event.

3. The system of claim 1, wherein the captured non-video data is correlated to the video data using timestamps, embedded tags or frame headers.

4. The system of claim 1, wherein the processor is configured to detect that the vehicle is approaching or is in an area in which the recordation of data is restricted by comparing vehicle location data provided by the GPS module to restricted area data stored in the one or more memory modules.

5. The system of claim 1, wherein the processor is further configured to:
    detect a type of restriction associated with the area, and
    select one or part of one of the video or non-video data to obscure based on the detected type of restriction.

6. The system of claim 5, wherein the processor is configured to obscure the captured video data by modifying one or more image setting of the camera such that details of imagery comprising the video data are not readily or at all discernible.

7. The system of claim 5,
    wherein the non-video data further comprises vehicle location data provided by the GPS module, and
    wherein the processor is configured to obscure the vehicle location data by obscuring details of the vehicle location data such that a location of the area in which the recordation of data is restricted is not readily or at all discernible from the recorded non-video data.

8. The system of claim 5,
    wherein the one or more sensors comprises a microphone configured to capture audio data such that the non-video data comprises audio data,
    wherein processor is configured to obscure the captured audio data by modifying one or more audio settings of the microphone such that details of sound comprising the audio data are not readily or at all discernible.

9. The system of claim 1, further comprising a wireless transceiver, coupled to the processor, wherein the processor is further configured to transmit, via the wireless transceiver to a remote server, the correlated video and non-video data together in one of the following manners:
    the video data in the obscured data format and the non-video data in the unobscured data format, or
    the video data in the unobscured data format and the non-video data in the obscured data format.

10. A method for providing location-dependent recording modes for an event detection and reporting system of a vehicle, the method comprising:
    operating the event detection and reporting system in an unrestricted mode in which video data captured by a camera and non-video data captured by one or more sensors are recorded such that the video data and non-video data are correlated in one or more memory modules of the system in an unobscured data format;
    detecting that the vehicle is approaching or is in an area in which the recordation of data is restricted by rule;

operating the event detection and reporting system in a restricted mode in response to detecting that the vehicle is approaching or is in the area in which the recordation of data is restricted; and recording, while the event detection and reporting system is in the restricted mode, either of the correlated video or non-video data in the one or more memory modules in an obscured data format that maintains the correlation of the unobscured data format; and recording, while the event detection and reporting system is in the restricted mode, the other of the correlated video or non-video data in the one or more memory modules in the unobscured data format.

11. The method of claim 10, wherein the video data and non-video data are recorded based a detected driving or vehicle event.

12. The method of claim 10, wherein the captured non-video data is correlated to the video data using timestamps, embedded tags or frame headers.

13. The method of claim 10, wherein detecting that the vehicle is approaching or is in the area in which the recordation of data is restricted comprises comparing vehicle location data provided by a GPS module of the event detection and reporting system to restricted area data stored in the one or more memory modules.

14. The method of claim 10, further comprising:
detecting a type of restriction associated with the area; and
selecting one or part of one of the video or non-video data to obscure based on the detected type of restriction.

15. The method of claim 14, further comprising providing the captured video data in the obscured data format by modifying one or more image setting of the camera such that details of imagery comprising the video data are not readily or at all discernible.

16. The method of claim 14,
wherein the non-video data further comprises vehicle location data provided by the GPS module, and
wherein the method further comprises providing vehicle location data in the obscured data format by obscuring details of the vehicle location data such that a location of the area in which the recordation of data is restricted is not readily or at all discernible from the recorded non-video data.

17. The method of claim 14,
wherein the one or more sensors comprises a microphone configured to capture audio data such that the non-video data comprises audio data, and
wherein method further comprises providing the captured audio data in the obscured data format by modifying one or more audio settings of the microphone such that details of sound comprising the audio data are not readily or at all discernible.

18. The method of claim 10, further comprising:
transmitting, via a wireless transceiver of the vehicle to a remote server, the correlated video and non-video data together in one of the following manners:
the video data in the obscured data format and the non-video data in the unobscured data format, or
the video data in the unobscured data format and the non-video data in the obscured data format.

* * * * *